Aug. 28, 1934.   J. A. MILLER   1,972,046
MILK BOTTLE DISPENSER
Original Filed Feb. 16, 1933   2 Sheets—Sheet 1
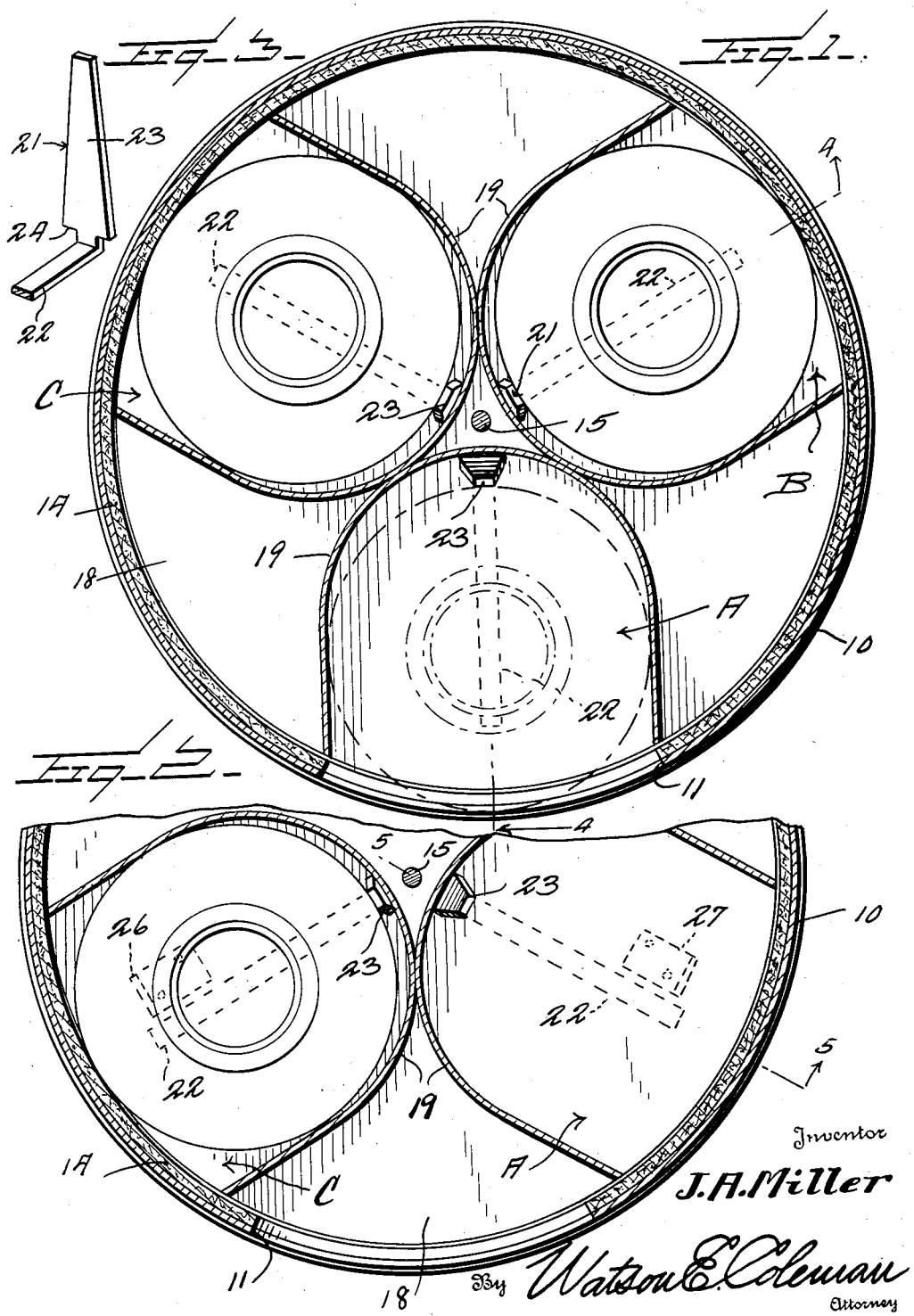

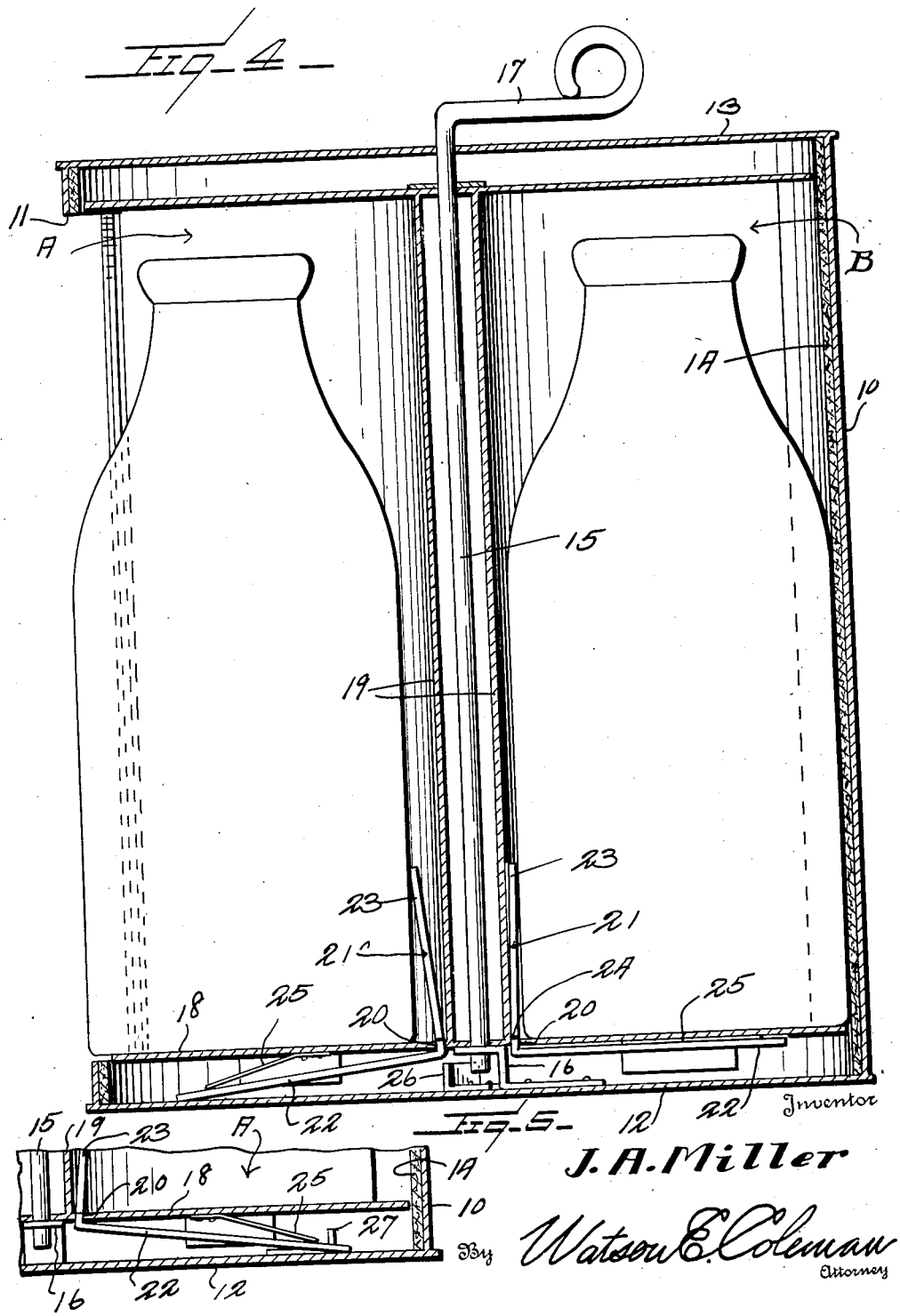

Patented Aug. 28, 1934

1,972,046

UNITED STATES PATENT OFFICE 1,972,046

MILK BOTTLE DISPENSER

Joseph A. Miller, Ottumwa, Iowa

Application February 16, 1933, Serial No. 657,131
Renewed June 7, 1934

5 Claims. (Cl. 232—41)

This invention relates to devices for dispensing milk bottles and particularly to those devices in which the milk bottles are protected from theft and contact with the elements.

The general object of the present invention is to provide a milk bottle dispenser which is so constructed that an empty bottle cannot be removed by the milkman until a bottle has been inserted within the dispensing mechanism and the dispensing mechanism turned to remove the empty bottle and in which the full bottle cannot be removed without the insertion of an empty bottle by the customer, the device thus requiring that a customer shall always insert an empty bottle before removing the filled bottle and thus causing empty bottles to be returned to the milkman.

A further object is to provide a device of this character which embodies a casing or housing with a rotatable milk bottle support therein, the outer casing having only one opening for the introduction and removal of bottles and the milk bottle support having a plurality of receptacles for the milk bottles and latching devices operated not by the weight of the bottles but only operating when a bottle of the proper size is inserted within the casing.

Other objects will appear in the course of the following description.

The invention is illustrated in the accompanying drawings, wherein:—

Figure 1 is a horizontal sectional view through an improved dispenser showing milk bottles in two of the receptacles and the third receptacle showing in dotted lines the manner in which a milk bottle is initially inserted;

Figure 2 is a sectional view on the same plane as Figure 1 but with the receptacle moved from the position shown in Figure 1;

Figure 3 is a perspective view of one of the latches;

Figure 4 is a vertical section on the line 4—4 of Figure 1;

Figure 5 is a fragmentary vertical section on the line 5—5 of Figure 2.

Referring to these drawings, 10 designates generally an outer casing or housing which may be made of any suitable material but is shown as made of metal. This housing is closed at top and botttom and is preferably cylindrical but has an opening 11 at one point. The housing has a bottom 12 and a top 13 and preferably the interior of the housing is lined with a layer 14 of heat insulating material.

Extending downwardly through the top of the housing is a shaft 15 supported at its lower end on an angular bracket 16 attached to the bottom 12, the upper end of this shaft being provided with a handle 17. Mounted upon this shaft for rotation therewith is a turn-table 18 carrying a plurality of bottle receptacles or compartments each formed by an approximately U-shaped sheet of metal designated 19. There are three of these bottle receptacles and I have designated them respectively A, B and C.

All of the receptacles are constructed in the same manner, however, so that the description of one of the receptacles applies to all of them. The edges of the U-shaped wall 19 of each receptacle terminate at the periphery of the platform 18 and closely adjacent to the housing and the opening 11 has approximately the diameter of a milk bottle and each of the receptacles as a consequence at its outer portion has approximately the width equal to the diameter of the milk bottle. The distance between the inner face of the wall of the housing or of the lining 14 thereof and the back of each receptacle is only slightly greater than the diameter of the milk bottle. I have illustrated the structure as being designed for dispensing quart milk bottles but it will, of course, be understood that it might be arranged for pints or half pints or milk bottles of any other standard capacity.

It will, therefore, be seen that when the bottles are inserted and the table or platform 18 rotated, the bottles must be forced back into the rear of the receptacles and held firmly in place in this position. The bottom of each receptacle is formed with a slot 20 and disposed through this slot is an angular detent designated generally 21, the lower portion of which extends normally and when the receptacle is full, parallel with the bottom of the receptacle and under these circumstances, the upper portion of this latch extends parallel to and bears against the rear wall of the receptacle. The lower arm of the latch is designated 22 and the upper arm 23. The latch may consist of a strip of metal having its lower arm 22 narrower than the upper arm so as to provide a shoulder 24 bearing against the bottom of the receptacle and constituting a fulcrum upon which the latch may swing.

A spring 25 shown as a leaf spring attached to the bottom of the receptacle or table forces the lower arm 22 downward but when a milk bottle is inserted in the receptacle and forced back against the rear wall thereof, it bears against the arm 23 and forces this arm rearward, thus raising the arm 22 against the action of the spring 25 and holding it in this raised position.

Coacting with these latches are two upwardly extending lugs 26 and 27 attached to the bottom wall 12 and shown as formed of angular pieces of metal riveted at the bottom, these lugs being disposed approximately equi-distant from the opening 11 and somewhat more than 120° apart.

It will be seen that when a latch is depressed under the action of the spring 25 because of the fact that no milk bottle is disposed within the compartment of that latch, the latch will be disposed so as to strike against one or the other of the lugs 26 or 27 and thus prevent more than a limited rotation of the table supporting the receptacles.

The operation of this mechanism is as follows:—

Assuming that there are two empty bottles one in the receptacle B and the other in the receptacle C and that the receptacle A has no bottle within it so that the latch is down, it will be obvious that the table cannot be turned to permit the removal of one of the empty bottles until a full bottle has been inserted into the receptacle A, pushed back therein and the table turned so that the rounded periphery of the full bottle will bear against the housing and the full bottle will be forced back against the arm 23.

Of course, without a bottle being inserted within the receptacle A, the receptacles and the table may be turned but before either of the receptacles B or C can reach the opening 19 to permit an empty bottle to be removed, the latch of receptacle A will contact with the lugs 26 or 27 and prevent the further movement of the rotatable table and receptacles, as shown in Figure 2.

In order to remove an empty bottle, therefore, the milkman must insert a full bottle in receptacle A. He then operates the handle 17 to rotate the table and receptacles and the full bottle engaging against the wall of the housing is forced back, lifting the latch of receptacle A.

Inasmuch as the latches of receptacle B and C are raised by the empty bottles therein, it follows that the milkman may rotate the table until the receptacle C, for instance, comes opposite the opening 11. He then removes the bottle from receptacle C, leaving the receptacle C at the opening 11. The latch of receptacle C, under these circumstances, is dropped or forced downward by the spring 25 and this prevents anything but a limited movement of the turn table until a bottle has been placed within the receptacle C. In order for the customer to secure the full bottle which is in receptacle A, it is necessary that he insert a bottle in receptacle C and thus raise the latch of this receptacle and then rotate the turn table by means of the handle 17 until receptacle A again comes opposite the opening 11 and the full bottle may be removed. There are now two empty bottles within the receptacle C and B and the milkman can only secure one of these bottles by the insertion of a full bottle of milk.

Should the customer want two bottles of milk instead of one, the milkman would insert in this compartment C, which stands empty, a full bottle of milk and then turn the rotatable compartment to the right, thus bringing compartment B in alinement with the opening. This will allow him to take the empty from this compartment. Thus the machine has two full compartments, one in compartment A, one in compartment C and compartment B has no bottle at all. This leaves the machine absolutely locked and it will turn to the right or to the left only until the latch of compartment B strikes against the lugs 26 or 27 and no bottle may be removed from the machine until an empty bottle has been inserted in compartment B.

It will be noted that this device is very simply constructed and that the operation of the device depends entirely on the use of a full-sized milk bottle. If the latches were operated by the weight of a bottle, then it might be easy to secure a weight which would depress the bottom of the bottle receptacle and release the latch thereof so that a full bottle of milk could be easily removed but with my construction only an object having the diameter and cylindrical form of a milk bottle could be used for this purpose and it is difficult to find any object having the exact size of a quart milk bottle to operate the machine. If the object be one-eighth of an inch too large, it will not pass through the opening 11 and even if it could pass, it would jam when it was attempted to rotate the turn table. If the object is one-eighth of an inch too small in diameter, it will not operate the latch or, in other words, while a person might force the object back against the latch and momentarily raise the latch, yet as soon as the object had passed beyond the opening 11, the spring 25 acting on the latch would force the object outward and depress the latch.

With a quart milk bottle, however, which practically fills the receptacle, the rounded periphery of the milk bottle bears against the inside face of the housing and positively forces the latch upward against the action of the spring 25. Thus it will be seen that this machine cannot be operated without the insertion of a quart milk bottle (or a pint milk bottle or gill if the machine is constructed for this purpose) or the insertion of an object having the exact size for which it is designed and that the weight of the article has nothing to do with the operation of the machine.

What is claimed is:—

1. A milk dispenser including an outer casing having a single opening, a plurality of bottle receptacles rigidly connected to each other, and mounted for unitary rotation within the outer casing, each receptacle having a width at its outer end approximately equal to the width of said opening, and a depth equal to the diameter of the bottle to be contained therein, means whereby the receptacle may be rotated, a latch for each receptacle including a portion extending upward at the back of the receptacle, and a portion disposed below the bottom of the receptacle, the last named portion being urged downward and a pair of lugs extending upward from the bottom of the outer casing and disposed in the path of movement of the latches when lowered, the lugs being disposed one on each side of the opening in the outer casing whereby bottles must be placed in all of the compartments in order to turn the receptacle to bring a compartment having a bottle in it into registry with the opening.

2. A milk bottle dispenser including a cylindrical outer casing having an opening, a plurality of bottle receptacles, rigidly connected to each other and mounted for unitary rotation within the outer casing, each of said receptacles having a width at its outer end approximately equal to the diameter of a milk bottle of a predetermined size, means whereby the receptacle may be rotated, and latching means associated with each receptacle and normally holding the receptacles from rotation within the outer casing, the latching means including a member disposed at the rear of the corresponding receptacle and engaged by a milk bottle when it is forced home, the space between the inner face of the outer casing and the rear wall of the receptacle closely approximating the diameter of the milk bottle whereby the milk bottle will be held engaged against said member and against displacement as a receptacle is turned away from said opening.

3. A milk bottle dispenser including an outer casing having an opening, a plurality of bottle receptacles rigidly connected to each other and mounted for unitary rotation within the outer casing, each receptacle having a width at its outer end equal to the diameter of a bottle of predetermined size and a depth from the rear wall of the receptacle to the inner face of the outer casing equal to the diameter of the said bottle, downwardly urged latching means for each of said receptacles mounted below the bottom of the receptacle, means disposed at the rear of each receptacle and engageable by a bottle inserted in said receptacle and causing the lifting of the latching means, and lugs projecting upward from the bottom of the outer casing and disposed in the path of movement of the latching means and one on each side of the opening, and spaced from the adjacent edges of the opening a distance greater than half the width of a receptacle.

4. A milk bottle dispenser including an outer casing having a single opening, a plurality of bottle receptacles rigidly connected to each other and mounted for unitary rotation within the outer casing, each receptacle having a width at its outer end equal to the diameter of a bottle to be disposed in the receptacle and having a depth from the back of the receptacle to the inner face of the outer casing equal to the diameter of the bottle, means whereby the receptacle may be manually rotated, an angular latch for each receptacle having a portion extending upward at the back of the receptacle and a portion extending radially outward below the bottom of the receptacle, the latch being pivotally supported between its ends and the lower portion of the latch being resiliently urged downward, and a pair of lugs extending upward from the bottom of the outer casing and disposed in the path of movement of the latches when lowered, the lugs being disposed one on each side of the opening in the outer casing and at a distance from the wall of said opening not less than half the width of a receptacle whereby bottles must be placed in all of the receptacles in order to turn the receptacle a sufficient distance to bring the receptacle into register with the opening.

5. A milk dispenser including a cylindrical outer casing having a single opening, a plurality of bottle receptacles rigidly connected to each other and mounted for unitary rotation within the outer casing, each receptacle having a width at its outer end equal to the width of said opening and to the diameter of the bottle to be contained therein and each receptacle having a depth from the back of the receptacle to the inner face of the casing equal to the diameter of said bottle, means on the exterior of the casing whereby the receptacles may be rotated, an angular latch for each receptacle, one arm of the latch extending upward at the back of the receptacle in front of the rear wall thereof, and the other arm extending radially outward below the bottom of the receptacle, each latch being pivotally supported upon the receptacle at the junction of its two arms, a spring urging the radial arm of the latch downward, and a pair of lugs mounted upon the outer casing below the bottom of the receptacles and disposed in the path of movement of the latches when the latches are lowered, the lugs being disposed one on each side of the opening in the outer casing whereby bottles must be placed in all of the receptacles in order to turn the receptacle a sufficient distance to bring a receptacle having a bottle therein into register with the opening.

JOSEPH A. MILLER.